(12) United States Patent
Pergantis et al.

(10) Patent No.: US 10,576,613 B2
(45) Date of Patent: Mar. 3, 2020

(54) METHODS AND TOOLS FOR PRESSING A RING SEAL INTO A COMPONENT

(71) Applicant: United Technologies Corporation, Farmington, CT (US)

(72) Inventors: John Pergantis, Manchester, CT (US); Anthony Valenti, Wolcott, CT (US); Usman Khan, North Haven, CT (US); Michael L. Comeau, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 43 days.

(21) Appl. No.: 15/947,269

(22) Filed: Apr. 6, 2018

(65) Prior Publication Data

US 2018/0222026 A1    Aug. 9, 2018

Related U.S. Application Data

(62) Division of application No. 14/696,967, filed on Apr. 27, 2015, now Pat. No. 9,969,069.

(51) Int. Cl.
| | |
|---|---|
| *B25B 27/06* | (2006.01) |
| *F16J 15/02* | (2006.01) |
| *F16J 15/08* | (2006.01) |
| *B25B 27/02* | (2006.01) |
| *B25B 27/00* | (2006.01) |
| *F01D 25/28* | (2006.01) |

(52) U.S. Cl.
CPC ........ *B25B 27/062* (2013.01); *B25B 27/0028* (2013.01); *B25B 27/023* (2013.01); *F16J 15/021* (2013.01); *F16J 15/027* (2013.01); *F16J 15/0893* (2013.01); *F01D 25/285* (2013.01)

(58) Field of Classification Search
CPC .. F16J 15/061; F16J 15/3268; B25B 27/0028; B25B 27/023; B25B 27/062; F01D 25/285

See application file for complete search history.

(56) References Cited

U.S. PATENT DOCUMENTS

| | | | |
|---|---|---|---|
| 3,981,066 | A | 9/1976 | Calvert |
| 4,551,898 | A | 11/1985 | Provost |
| 5,355,574 | A | 10/1994 | Zweekly |
| 5,692,437 | A | 12/1997 | Tabain |
| 5,709,018 | A | 1/1998 | Dugan |
| 5,893,202 | A | 4/1999 | Graham et al. |

(Continued)

FOREIGN PATENT DOCUMENTS

DE    102005001225 A1 *  7/2006  ............ B23P 19/084

OTHER PUBLICATIONS

Machine Translation of DE-102005001225-A1.*

*Primary Examiner* — Nicholas L Foster
(74) *Attorney, Agent, or Firm* — Getz Balich LLC (57) ABSTRACT

Methods and tools are provided for pressing a ring seal into a component. In one method, a tool is anchored to the component. The tool includes a first aperture which extends along an axis. The first aperture is coaxial with a second aperture in the component. The ring seal is pushed axially through the first aperture towards the component, where the tool radially compresses the ring seal as the ring seal moves axially towards the component. The radially compressed ring seal is pressed into the second aperture using the tool.

14 Claims, 9 Drawing Sheets

(56) References Cited

U.S. PATENT DOCUMENTS

| | | | |
|---|---|---|---|
| 5,956,830 A * | 9/1999 | Imbus | B23P 19/084 |
| | | | 29/229 |
| 6,012,209 A | 1/2000 | Whetstone | |
| 6,044,539 A | 4/2000 | Guzowski | |
| 6,065,198 A | 5/2000 | Vitous et al. | |
| 6,397,446 B1 | 6/2002 | Whetstone | |
| 7,380,323 B2 * | 6/2008 | Bussell | B25B 27/0028 |
| | | | 28/238 |
| 7,526,847 B1 | 5/2009 | Arthur et al. | |
| D594,718 S | 6/2009 | Duffy | |
| 8,863,768 B2 | 10/2014 | Kang | |
| 2007/0186399 A1 | 8/2007 | Bussell et al. | |
| 2013/0153049 A1 | 6/2013 | Kang | |
| 2014/0223920 A1 | 8/2014 | Stevens et al. | |
| 2014/0255167 A1 | 9/2014 | Sasaki | |

\* cited by examiner

METHODS AND TOOLS FOR PRESSING A RING SEAL INTO A COMPONENT

This patent application is a divisional of and claims priority to U.S. patent application Ser. No. 14/696,967 filed Apr. 27, 2015. The '967 application is hereby incorporated herein by reference in its entirety.

BACKGROUND OF THE INVENTION

1. Technical Field

This disclosure relates generally to a ring seal and, more particularly, to a method and a tool for pressing a ring seal into a component such as, for example, a bearing housing for a gas turbine engine.

2. Background Information

Various seals are known in the art for sealing gaps between components of a gas turbine engine. Various tools and methods are known for installing such seals with the components. While these tools and methods have certain benefits, there is still room in the art for improvement to reduce damage to the seals during installation.

SUMMARY OF THE DISCLOSURE

According to an aspect of the invention, a tool is provided for pressing a ring seal into a component. This tool includes a base, a support, a pusher and an actuator. The base includes a first end, a second end and a sidewall which forms an aperture along an axis through the base between the first end and the second end. At least a portion of the sidewall radially tapers as the sidewall extends towards the second end. The support extends out from the second end and laterally overlaps the aperture. The pusher is configured to axially engage the ring seal. The actuator is mounted to the support. The actuator is configured to translate the pusher along the axis and thereby push the ring seal through the aperture and press the ring seal into the component.

According to another aspect of the invention, another tool is provided for pressing a ring seal into a component. This tool includes a base and a press. The base includes a first end, a second end and a sidewall which forms an aperture along an axis through the base between the first end and the second end. The press is configured to push the ring seal axially through the aperture and press the ring seal into the component. The base is configured to radially compress the ring seal as the press pushes the ring seal axially through the aperture. The sidewall has an elongated cross-sectional geometry.

According to still another aspect of the invention, a method is provided involving a ring seal and a component. A tool is anchored to the component. The tool includes a first aperture which extends along an axis. The first aperture is coaxial with a second aperture in the component. The ring seal is pushed axially through the first aperture towards the component. The tool radially compresses the ring seal as the ring seal moves axially towards the component. The radially compressed ring seal is pressed into the second aperture using the tool.

The press may include a pusher configured to axially engage the ring seal. The press may also include an actuator configured to translate the pusher along the axis and thereby push the ring seal through the aperture and press the ring seal into the component.

The at least a portion of the sidewall may extend axially from the first end towards the second end.

The at least a portion of the sidewall may be a first portion. A non-tapered second portion of the sidewall may be arranged between the first portion and the second end.

The first portion may extend an axial first length. The second portion may extend an axial second length that is less than the first length.

The pusher may have an elongated cross-sectional geometry.

The pusher may have an oval cross-sectional geometry.

The pusher may include a base portion and an annular notch that extends axially and radially into the base portion. The pusher may be configured to receive the ring seal in the notch.

The notch may be at a distal end of the base portion. The pusher may include a guide portion which projects axially out from the base portion at the distal end.

The pusher may be rotationally fixed relative to the support and the base.

The actuator may include a threaded shaft and a handle. The threaded shaft may extend along the axis from the handle, through the support, and engage the pusher.

The support may be mounted to the base with one or more fasteners.

The tool may include one or more fasteners for anchoring the base to the component.

The tool may include a pusher which presses the radially compressed ring seal into the second aperture. The pusher may include a guide portion which projects into the component to guide movement of the pusher.

The tool may include a pusher which presses the radially compressed ring seal into the second aperture. The pusher may axially contact the component to axially locate the ring seal within the second aperture.

The component may be configured as or otherwise include a component of a gas turbine engine.

The ring seal may be configured as a radial pinch seal.

The ring seal may have an elongated cross-sectional geometry.

The foregoing features and the operation of the invention will become more apparent in light of the following description and the accompanying drawings.

DETAILED DESCRIPTION OF THE INVENTION

Figure 1:
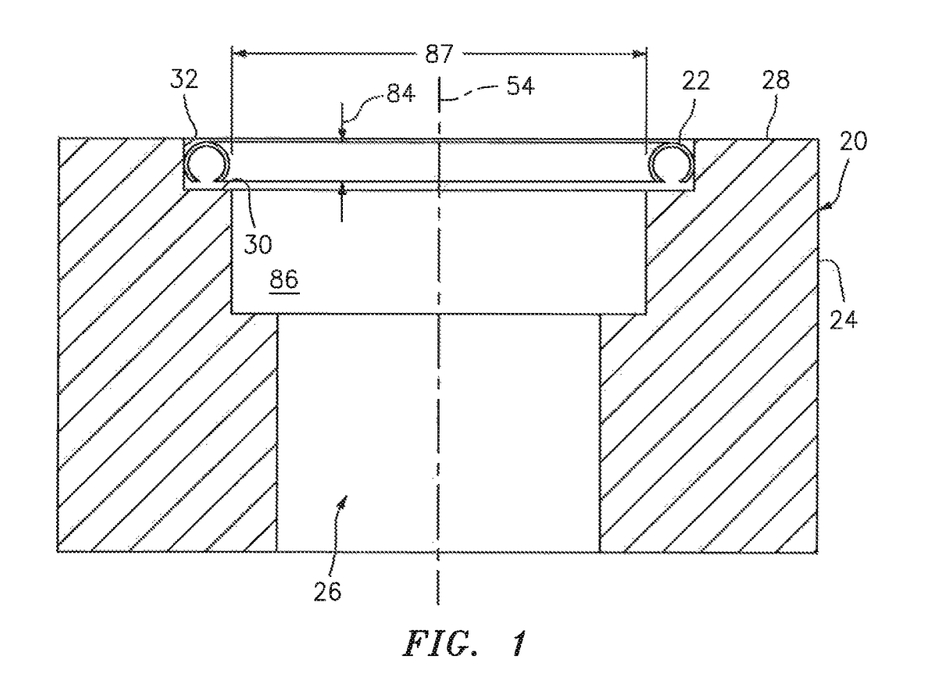
FIG. 1 is a side sectional illustration of a ring seal pressed into a component.
Figure 2:
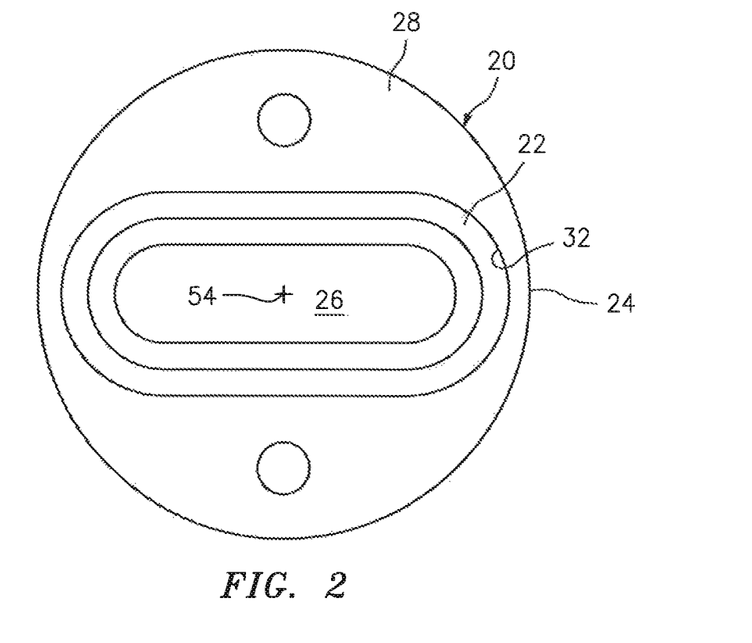
FIG. 2 is a top view illustration of the ring seal and the component.

Methods and tools are disclosed herein for pressing a ring seal into a component. An exemplary embodiment of such a component 20 and such a ring seal 22 is shown in FIGS. 1 and 2. The component 20 in this embodiment is described below with reference to a particular turbine engine component for ease of description. The methods and tools of the present disclosure, however, are not limited to pressing a ring seal into any particular turbine engine component. Furthermore, the methods and tools of the present disclosure may also be used for pressing a ring seal into a component configured for non-turbine engine applications.

Referring to FIGS. 1 and 2, the component 20 is configured as a bearing housing for supporting and/or containing a bearing within a turbine engine. This bearing housing includes a boss 24 which projects out therefrom. The boss 24 includes an aperture 26 which extends into the boss 24 from an exterior surface 28. This aperture 26 is fluidly coupled with an interior cavity within the bearing housing and may be operable to direct lubricant into or out of the bearing housing during turbine engine operation. More particularly, the boss 24 is configured to mate with a. fitting (not shown). Such a fitting may fluidly couple the aperture 26 to another component of an engine lubrication system.

To prevent lubricant leakage between the boss 24 and the fitting, the ring seal 22 is pressed and seated within the aperture 26 at (e.g., on, adjacent or proximate) an annular shelf 30. This ring seal 22 may provide a radial seal between the boss 24 and the fitting. The ring seal 22 of FIGS. 1 and 2, for example, is configured as a radial pinch seal. More particularly, the ring seal 22 is configured as a coated metal alloy radial pinch c-seal with a generally "c" shaped cross-sectional geometry. The present disclosure, however, is not limited to any particular type of ring seal 22 or seal materials. In other embodiments, for example, the ring seal 22 may be configured as a w-seal, a v-seal, an s-seal or any other type of radial pinch ring seal.

In the specific embodiment of FIGS. 1 and 2, the aperture 26 and the ring seal 22 both have an elongated cross-sectional geometry. More particularly, a sidewall 32 of the aperture 26 and the ring seal 22 both have an oval (e.g., elliptical, race-track, etc.) cross-sectional geometry. However, the present disclosure is not limited to any particular elongated cross-sectional geometry. Furthermore, in alternative embodiments, the aperture 26 and the ring seal 22 may have a circular or a square cross-sectional geometry; i.e., a non-elongated cross-sectional geometry.

Figure 3:
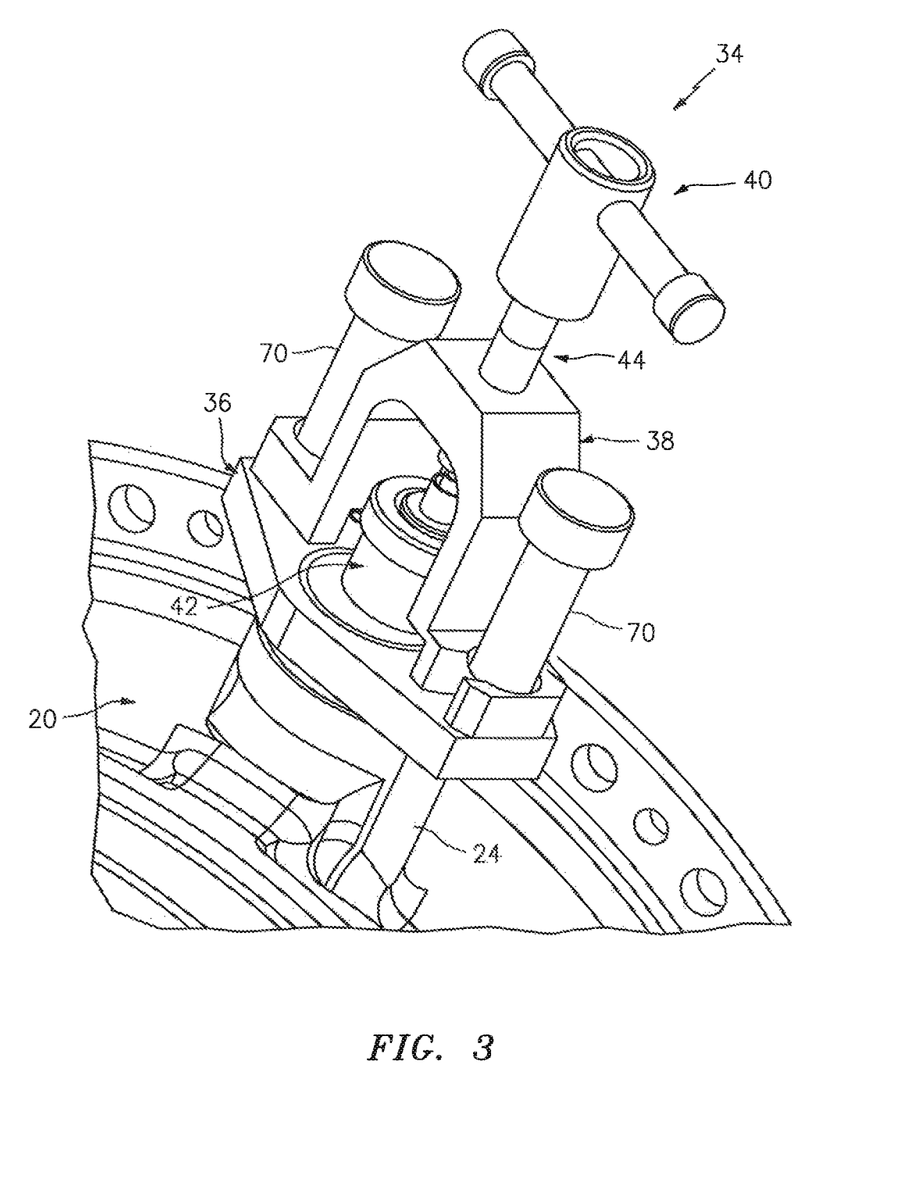
FIG. 3 is a perspective illustration of a tool mounted to the component.
Figure 4:
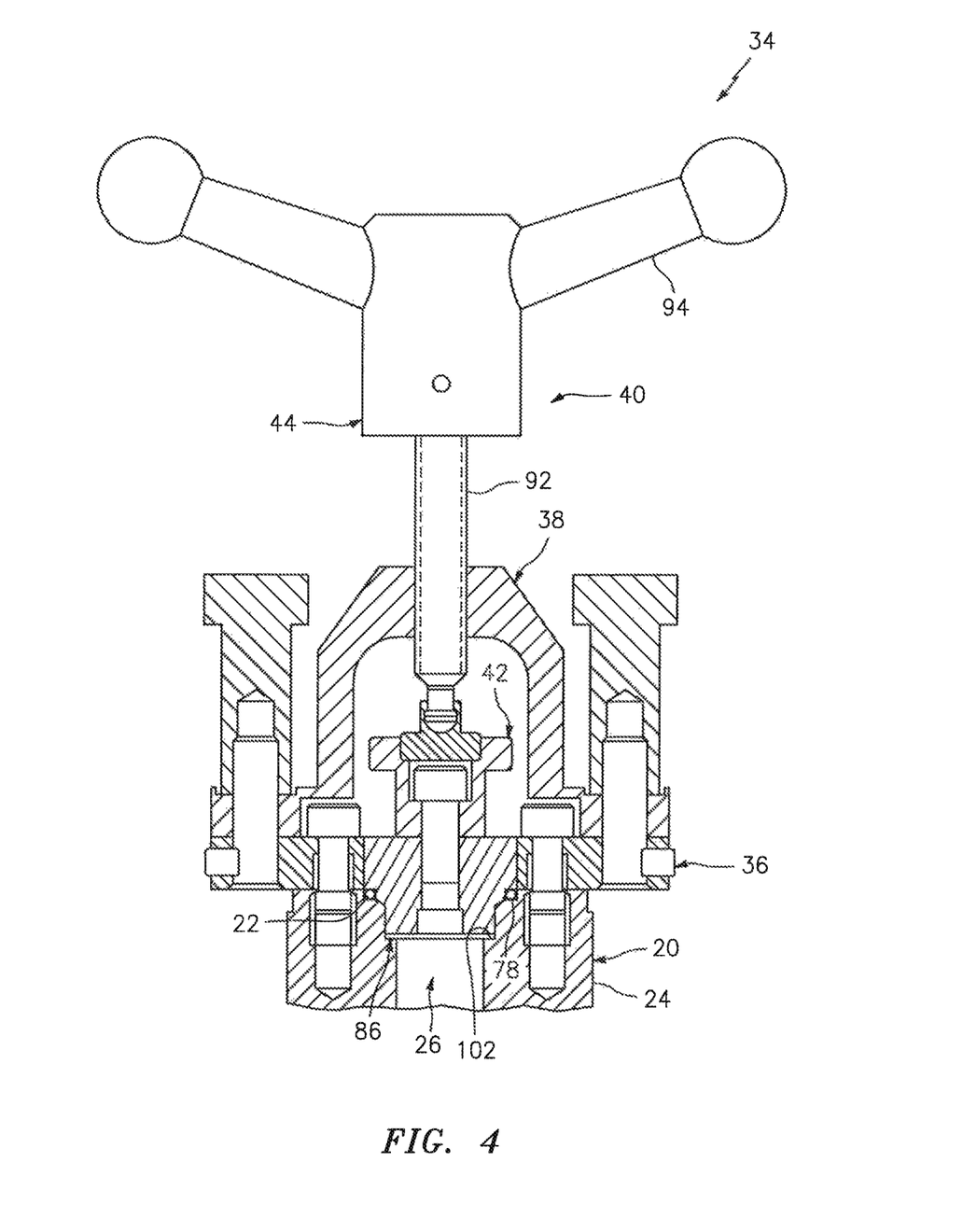
FIG. 4 is a side sectional illustration of the tool with the ring seal and the component.

FIGS. 3 and 4 illustrate a tool 34 mated with the boss 24. This tool 34 is configured for pressing the ring seal 22 into the aperture 26. The tool 34 includes a base 36, a support 38 and a press 40. The press 40 includes a ring seal pusher 42 and an actuator 44.

Figure 5:
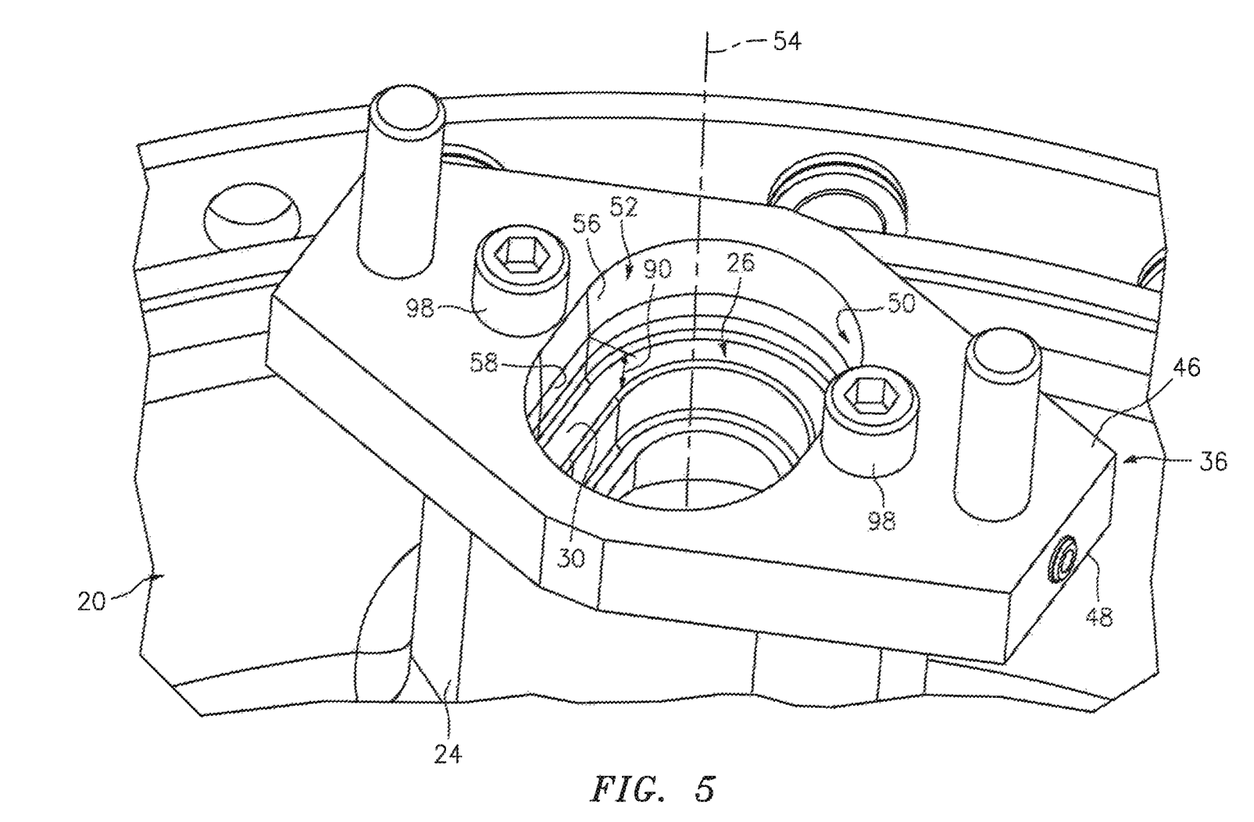
FIG. 5 is a perspective illustration of a base of the tool mounted to the component.
Figure 6:
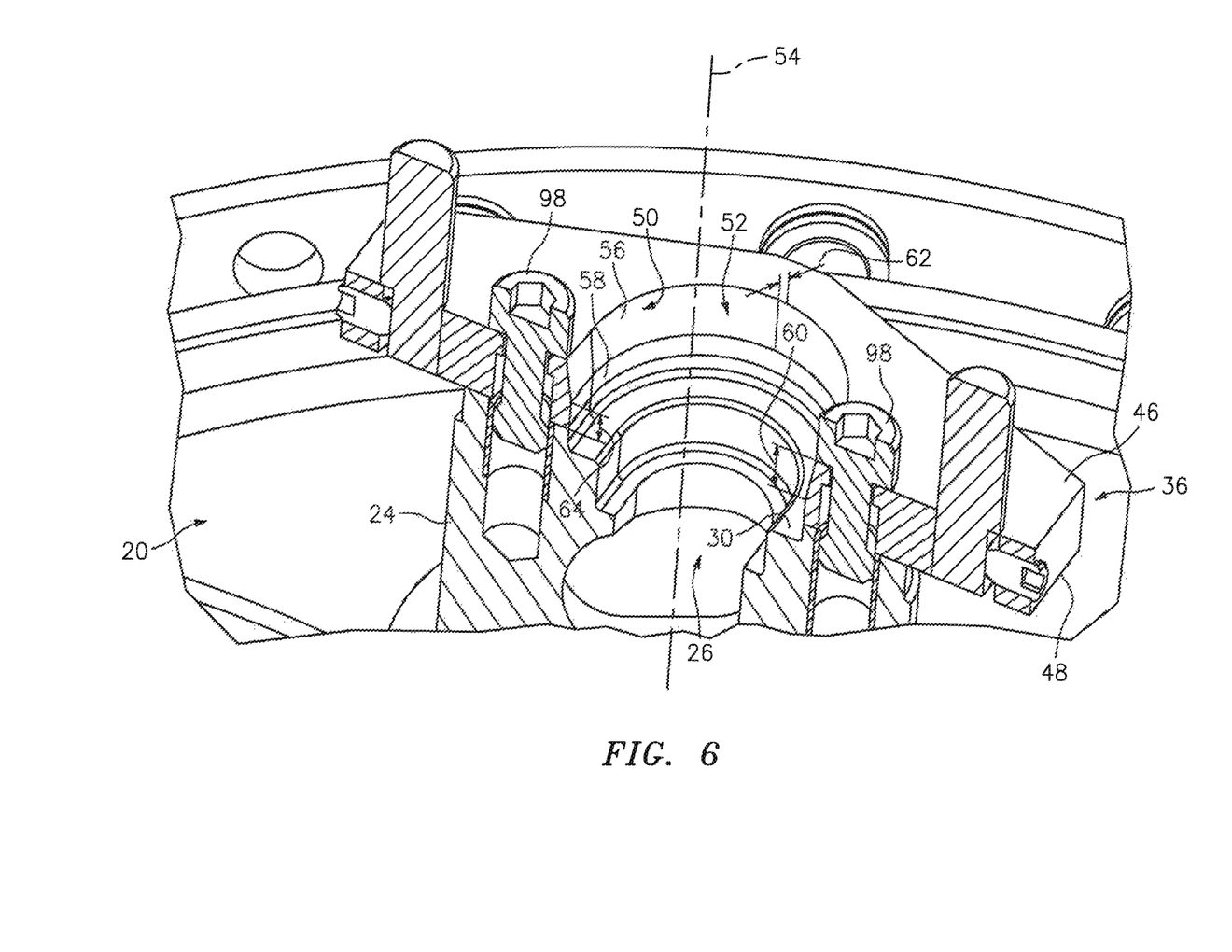
FIG. 6 is a perspective sectional illustration of the base with the component.

Referring to FIGS. 5 and 6, the base 36 may be configured as a flat plate. The base 36 includes a first end 46, a second end 48 and an interior sidewall 50. This sidewall 50 forms an aperture 52 (e.g., a through-hole or bore) along an axis 54 through the base 36 between the first end 46 and the second end 48. At least a portion 56 of the sidewall 50 radially tapers as the sidewall 50 extends axially towards the second end 48. In particular, the sidewall 50 of FIGS. 5 and 6 includes the tapered first portion 56 and a non-tapered second portion 58, The first portion 56 extends axially from the first end 46 to the second portion 58 and has an axial first length 60. Typically, this first length 60 (e.g., rise) is more than about three times (3×) to five times (5×) a lateral thickness 62 (e.g., run) of the first portion 56. This first portion 56 may be angularly offset from the axis 54 and/or the second portion 58 by an angle between about two degrees (2°) and about twenty-five degrees (25°). The second portion 58, in contrast, is substantially parallel to the axis 54 and perpendicular to respective surfaces at the first and the second ends 46 and 48. The second portion 58 extends axially from the second end 48 to the first portion 56 and has an axial second length 64. The second length 64 may be less than the first length 60; e.g., less than one half of the first length 60, The present disclosure, of course, is not limited to the foregoing exemplary numerical relationships.

The sidewall 50 of FIGS. 5 and 6 is configured with an elongated. cross-sectional geometry. In particular, the sidewall 50 is configured with an oval (e.g., elliptical, race-track, etc.) cross-sectional geometry which matches shape of the cross-sectional geometry of the ring seal 22 and the aperture 26 in the component 20 (see also FIGS. 1, 2 and 4). However, the present disclosure is not limited to any particular elongated cross-sectional geometry. Furthermore, in alternative embodiments, the sidewall 50, aperture 26 and the ring seal 22 may have a circular or a square cross-sectional geometry; i.e., a non-elongated cross-sectional geometry.

The sidewall 50 is sized such that the ring seal 22 may be placed within the aperture 52 in a relaxed state (see also FIG. 10); e.g., without being forced or radially compressed. In particular, a size (e.g., length, width or radius) of the aperture 52 at the first end 46 is greater than a corresponding size (e.g., length, width or radius) of the ring seal 22. In contrast, a size of the aperture 52 at the second end 48 is less than a corresponding size of the ring seal 22. In this manner, the sidewall 50 may slowly radially compress the ring seal 22 as the ring seal 22 is pushed axially through the aperture 52 as described below in further detail.

Figure 7:
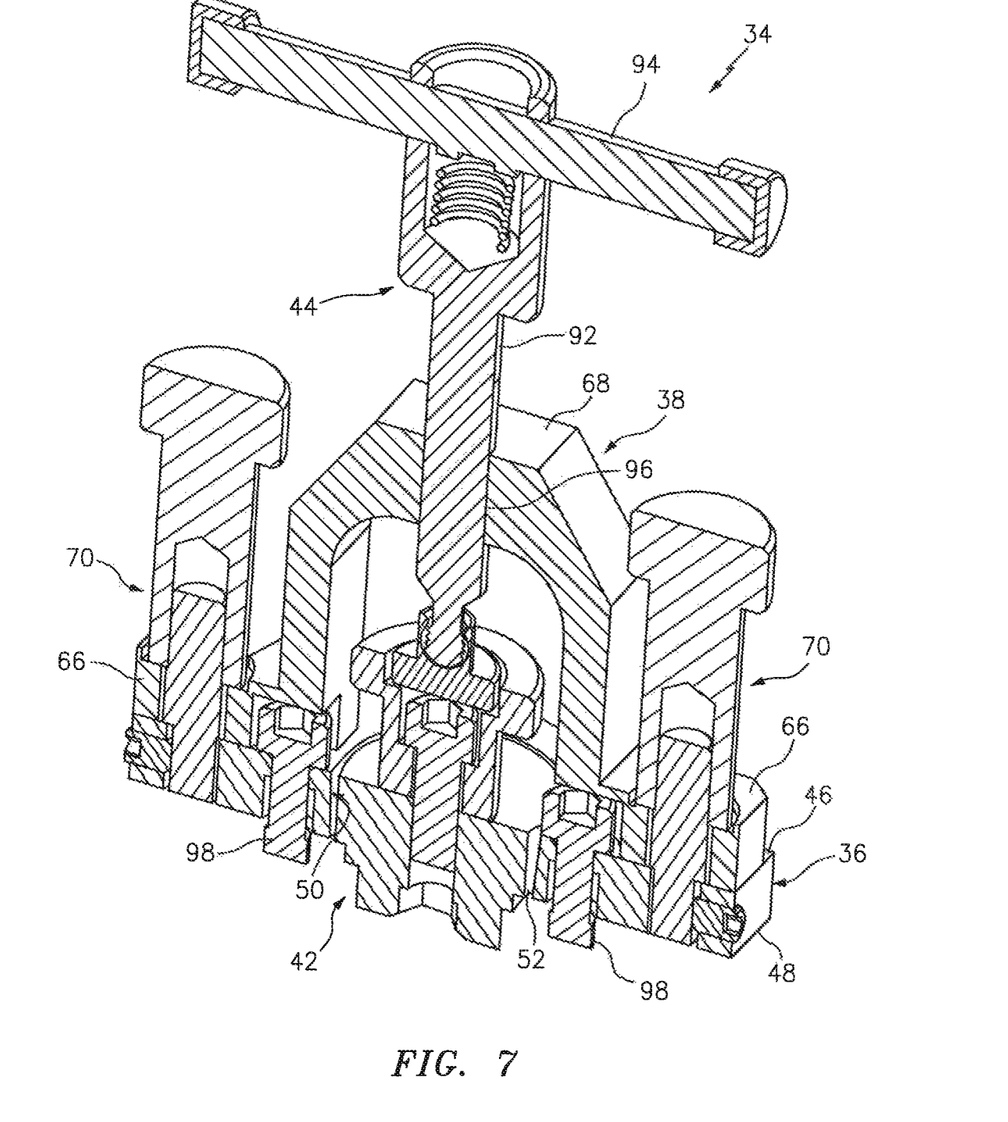
FIG. 7 is a perspective sectional illustration of the tool.
Figure 8:
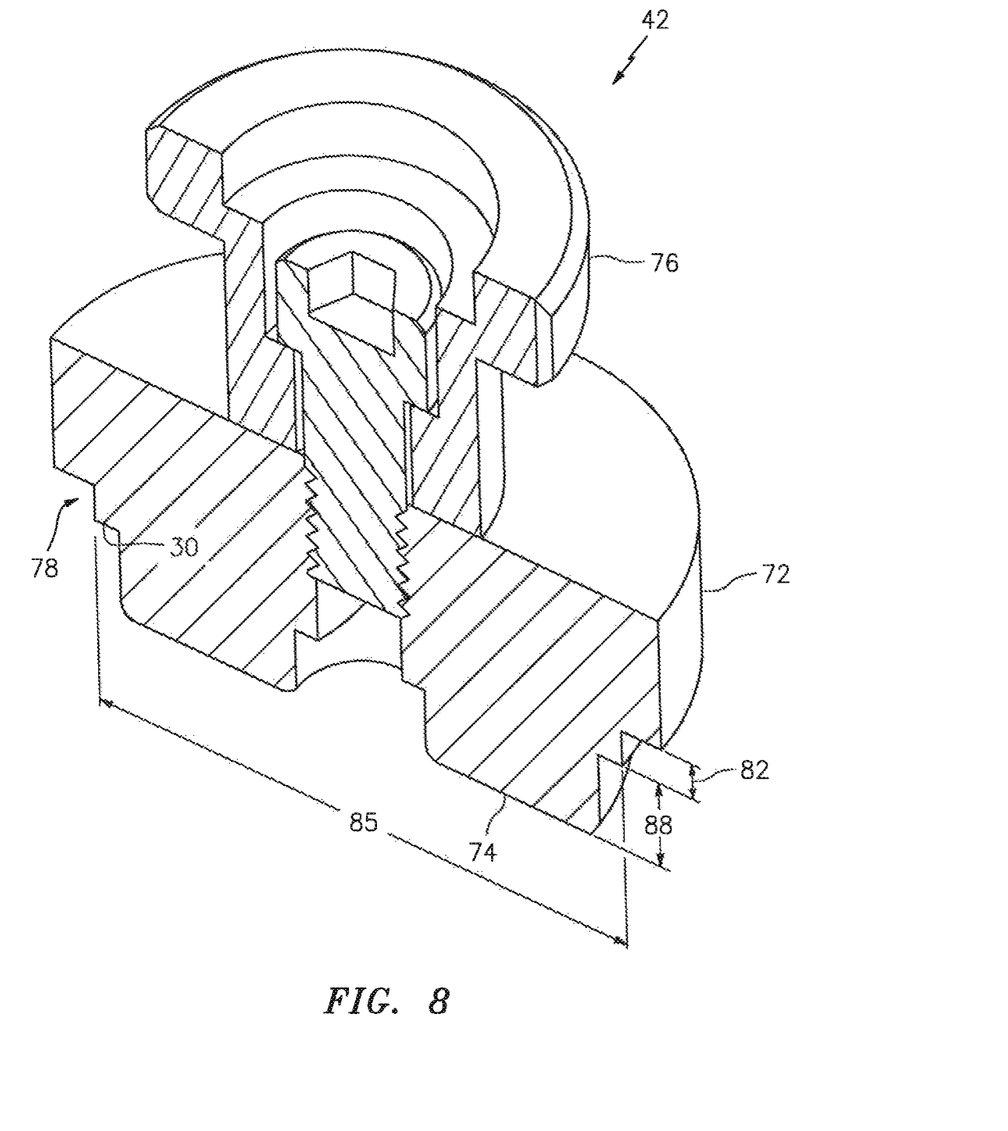
FIG. 8 is a perspective sectional illustration of a ring seal pusher of the tool.

Referring to FIG. 7, the support 38 may be configured as a bridge support. The support 38 includes one or more mounting portions 66 and a bridge portion 68. The mounting portions 66 are configured to be connected to the base 36 at the first end 46. Each of the mounting portions 66, for example, may be removably attached to the base 36 with at least one mechanical fastener 70 such as, but not limited to, a threaded stud and a captive nut. The present disclosure, however, is not limited to any particular support attachment technique. The bridge portion 68 extends laterally between the mounting portions 66 and thereby laterally overlaps the aperture 52. The bridge portion 68 also extends out from mounting portions 66 and the base 36 at the first end 46, which provides the bridge portion 68 with an arched configuration, Referring to FIG. 8, the ring seal pusher 42 includes a base portion 72 and a guide portion 74. The ring seal pusher 42 may also include an actuator engagement portion 76. The base portion 72 is configured with a cross-sectional geometry that is substantially the same as that of the second portion 58 of the sidewall 50 (see FIG. 7). A size (e.g., length, width or radius) of the base portion 72, however, is slightly smaller than a corresponding size (e.g., length, width or radius) of the second portion 58 of the sidewall 50 to enable the ring seal pusher 42 to axially translate through the aperture 52 (see FIGS. 5 and 6).

The base portion 72 includes an annular notch 78 at an axial distal end 80 thereof. This notch 78 extends axially and radially into the base portion 72. The base portion 72 is configured to receive the ring seal 22 within the notch 78 as shown in FIG. 4. An axial length 82, of the notch 78 may be greater than an axial thickness 84 (see FIG. 1) of the ring seal 22, An outer lateral size 85 (e.g., length, width or radius) of the base portion 72 may be sized smaller than an inner lateral size 87 (e.g., length, width or radius) of the ring seal 22 where the ring seal 22 is radially compressed and seated within the aperture 26; see FIG. 1. In this manner, the ring seal pusher 42 may be disengaged from the ring seal 22 and removed after pressing the ring seal 22 into the component 20 without the ring seal 22 being "stuck" on the base portion 72. However, the present disclosure is not limited to such exemplary relationships as described above.

The guide portion 74 projects axially out from the base portion 72 at the distal end 80. This guide portion 74 is configured to project into and nest with a corresponding portion 86 of the aperture 26 as shown in FIGS. 1 and 4. In this mariner, the guide portion 74 may significantly limit or prevent lateral movement of the ring seal pusher 42 as it is axially translated. In general, an axial length 88 of the guide portion 74 is longer than an axial distance 90 (see FIG. 5) from the first portion 56 to the shelf 30; however, the present disclosure is not limited to such a relationship.

The actuator engagement portion 76 is arranged axially opposite the guide portion 74. The actuator engagement portion 76 projects axially out from the base portion 72 and is configured to engage the actuator 44.

Referring to FIG. 7, the actuator 44 is mounted to the support 38. The actuator 44 is configured to translate the ring seal pusher 42 along the axis 54 and within the aperture 52. The actuator 44 of FIG. 7, for example, is configured as a threaded shaft 92 with a handle 94. The threaded shaft. 92 extends along the axis 54 from the handle 94, through a threaded aperture 96 in the bridge portion 68, and axially engages the ring seal pusher 42.

Figure 9:
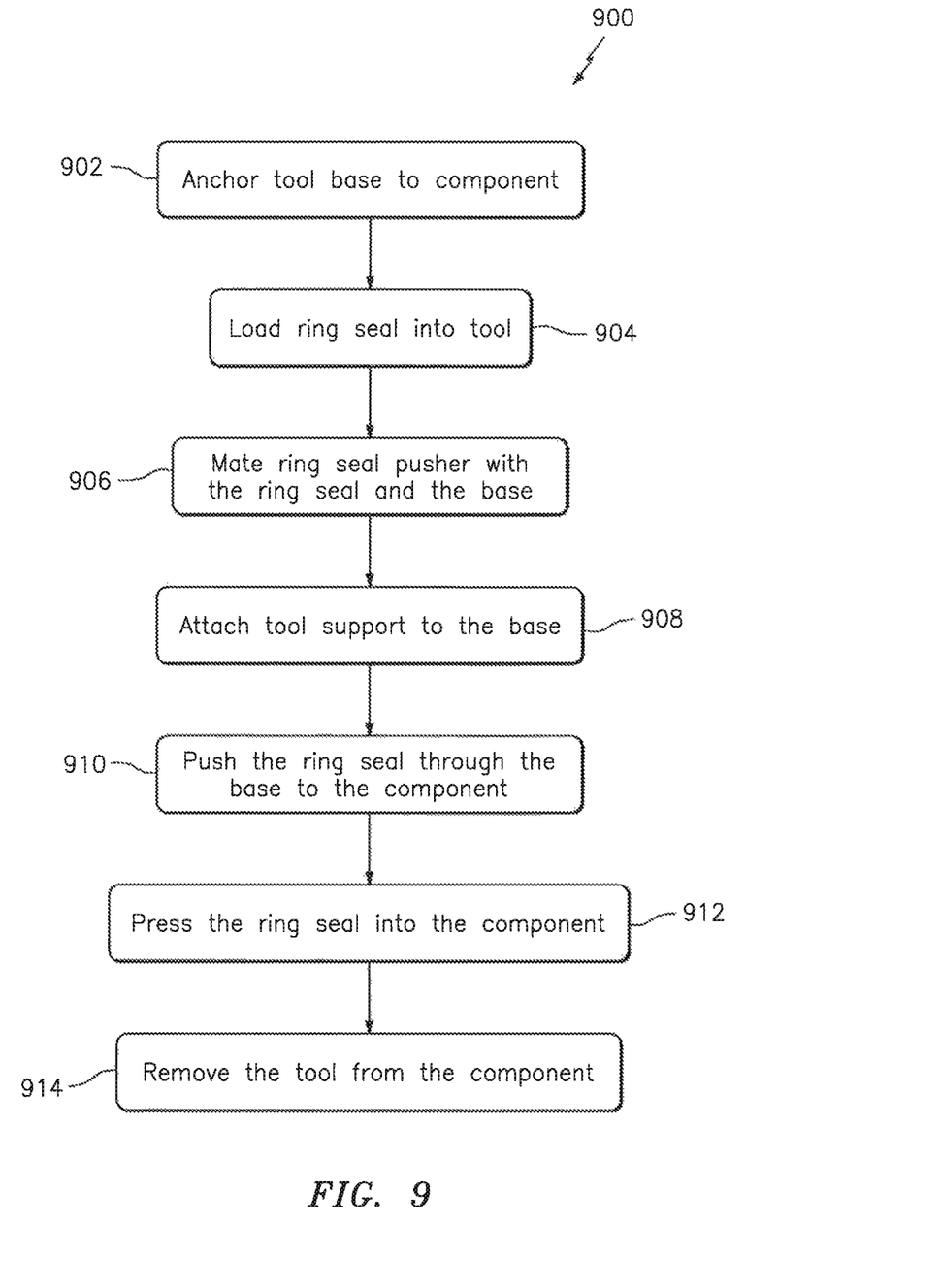
FIG. 9 is a flow diagram of a method for installing the ring seal into the component using a tool.

FIG, 9 is a flow diagram of a method for installing the ring seal 22 into the component 20 using a tool such as, but not limited to, the tool 34 described above. In step 902, the base 36 is anchored to the component 20. The base 36, for example, may be removably attached to the component 20 using one or more fasteners 98 (e.g., bolts) as illustrated in FIGS. 5 and 6. Once mounted, the apertures 26 and 52 are substantially co-axial.

Figure 10:
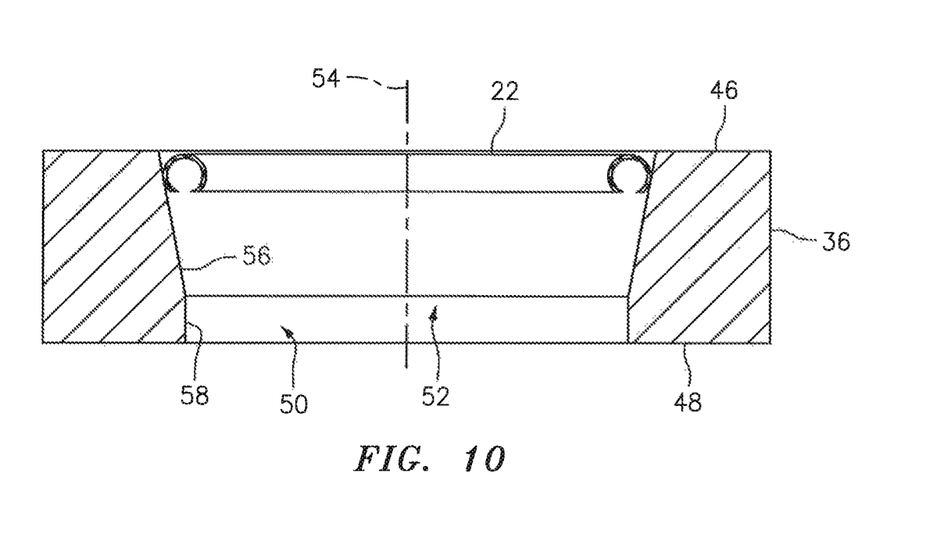
FIG. 10 is a side sectional illustration of the ring seal loaded into the base.

In step 904, the ring seal 22 is loaded into the tool 34. The ring seal 22, for example, is placed into the aperture 52 from the first end 46 as shown in FIG. 10. In this initial position, the ring seal 22 is in its relaxed state.

In step 906, the ring seal pusher 42 is mated with the ring seal 22 and the base 36. The ring seal pusher 42, for example, is inserted into the ring seal 22 and the aperture 52 such that the ring seal 22 is seated in the notch 78. The guide portion 74 extends within the aperture 52 and may project into the aperture 26.

In step 908, the support 38 is attached to the base 36. The mounting portions 66, for example, are mounted to the base 36 with the fasteners 70 as illustrated in FIGS. 3 and 7.

Figure 11:
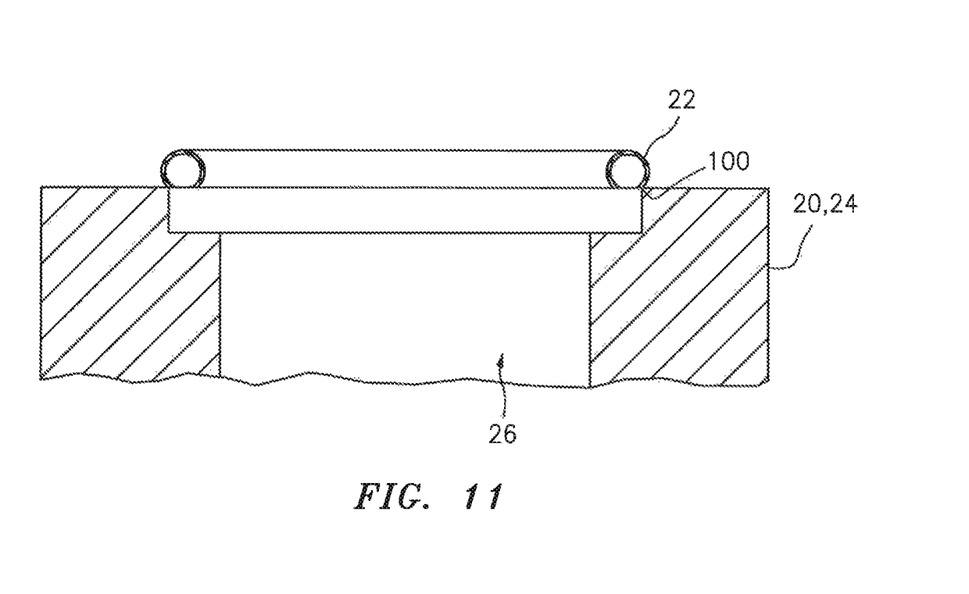
FIG. 11 is a side sectional illustration of the ring seal adjacent the component.

In step 910, the ring seal 22 is pushed through the aperture 52 to the component 20. The handle 94, for example, may be twisted such that the shaft 92 moves downwards towards the base 36 and the component 20. The downward movement of the shaft 52 causes the ring seal pusher 42 to translate along the axis 54 towards the component 20 thereby pushing the ring seal 22 down through the aperture 52. As the ring seal 22 moves axially through the aperture 52, the tapered first portion 56 of the sidewall 50 radially compresses the ring seal 22 until the size of the ring seal 22 is the same as the second portion 58 of the sidewall 50 and the aperture 26. This gradual compression of the ring seal 22 may serve to reduce damage to the ring seal 22 and its coating. For example, if the ring seal 22 was instead pushed directly into the aperture 26 from a relaxed state as shown in FIG. 11, an edge 100 of the component 20 may chip some or all of the coating off of the ring seal 22. Such an abrupt compression of the ring seal 22 may also or alternatively deform or otherwise damage the ring seal 22.

In step 912, the ring seal 22 is pressed into the component 20. The ring seal pusher 42, for example, pushes the ring seal 22 downward out of the aperture 52 and into the aperture 26. The ring seal pusher 42 continues its movement until the guide portion 74 axially contacts the component 20 at a shelf 102 (see FIG. 4). This contact may serve to axially locate the ring seal 22 within the aperture 26 adjacent the shelf 30. The contact may also serve to prevent axial compression or axial over-compression of the ring seal 22.

In step 914, the tool 34 is removed from the component 20. The handle 94, for example, may be twisted in a reverse direction to back off the ring seal pusher 42. The support 38 may he disconnected from the base 36. The base 36 may be disconnected from the component 20.

The tools and methods described above may be use to press a ring seal into a component of various types of gas turbine engines including turbine engines configured for aircraft propulsion systems as well as turbine engines configured for industrial applications. The component and ring seal, for example, may he included in a geared turbine engine where a gear train connects one or more shafts to one or more rotors in a fan section, a compressor section and/or any other engine section. Alternatively, the component and ring seal may be included in a turbine engine configured without a gear train. The component and ring seal may be included in a geared or non-geared turbine engine configured with a single spool, with two spools, or with more than two spools. The turbine engine may be configured as a turbofan engine, a turbojet engine, a propfan engine, a pusher fan engine or any other type of turbine engine. The present invention therefore is not limited to any particular types or configurations of gas turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method comprising:
   anchoring a tool to a component, wherein the tool includes a first aperture which extends along an axis, and the first aperture is coaxial with a second aperture in the component;
   pushing a ring seal axially through the first aperture towards the component, wherein the tool radially compresses the ring seal as the ring seal moves axially towards the component; and
   pressing the radially compressed ring seal into the second aperture using the tool;
   wherein the ring seal has an elongated cross-sectional geometry when viewed in a plane that is perpendicular to the axis, the elongated cross-sectional geometry has a first overall width along a first direction within the plane, the elongated cross-sectional geometry has a second overall width along a second direction within the plane, the first overall width is different than the second overall width, the first direction is different from the second direction, and the first direction and the second direction are coincident with the axis within the plane.

2. The method of claim 1, wherein the tool comprises a pusher which presses the radially compressed ring seal into the second aperture, and the pusher includes a guide portion which projects into the component to guide movement of the pusher.

3. The method of claim 1, wherein the tool comprises a pusher which presses the radially compressed ring seal into the second aperture, and the pusher axially contacts the component to axially locate the ring seal within the second aperture.

4. The method of claim 1, wherein the component is a component of a gas turbine engine.

5. The method of claim 1, wherein the ring seal comprises a radial pinch seal.

6. The method of claim 1, wherein the elongated cross-sectional geometry is an oval cross-sectional geometry.

7. The method of claim 2, wherein the pusher axially contacts the component to axially locate the ring seal within the second aperture.

8. A method comprising:
   anchoring a tool to a component, wherein the tool includes a first aperture extending along an axis, and the first aperture is coaxial with a second aperture in the component;
   pushing a ring seal axially along the axis through the first aperture towards the component, wherein the tool radially compresses the ring seal as the ring seal moves axially along the axis towards the component; and
   pressing the radially compressed ring seal into the second aperture using the tool;
   wherein the ring seal has an elongated cross-sectional geometry when viewed in a plane perpendicular to the axis, a first direction width of the elongated cross-sectional geometry in a first direction through the plane is different than a second direction width of the elongated cross-sectional geometry in a second direction through the plane, the first direction is perpendicular to the second direction, and the first direction and the second direction are each coincident with the axis.

9. The method of claim 8, wherein the tool comprises a pusher which presses the radially compressed ring seal into the second aperture, and the pusher includes a guide portion which projects into the component to guide movement of the pusher.

10. The method of claim 9, wherein the pusher axially contacts the component to axially locate the ring seal within the second aperture.

11. The method of claim 8, wherein the tool comprises a pusher which presses the radially compressed ring seal into the second aperture, and the pusher axially contacts the component to axially locate the ring seal within the second aperture.

12. The method of claim 8, wherein the component is a component of a gas turbine engine.

13. The method of claim 8, wherein the ring seal comprises a radial pinch seal.

14. The method of claim 8, wherein the elongated cross-sectional geometry is an oval cross-sectional geometry.

* * * * *